US012717564B2

(12) United States Patent
Cha et al.

(10) Patent No.: US 12,717,564 B2
(45) Date of Patent: Aug. 25, 2026

(54) METHOD AND APPARATUS FOR DETERMINING BINARY FUNCTION ENTRY

(71) Applicant: Korea Advanced Institute of Science and Technology, Daejeon (KR)

(72) Inventors: Sang Kil Cha, Daejeon (KR); Hyungseok Kim, Daejeon (KR); Junoh Lee, Daejeon (KR); Soomin Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 391 days.

(21) Appl. No.: 18/360,011

(22) Filed: Jul. 27, 2023

(65) Prior Publication Data

US 2024/0176623 A1 May 30, 2024

(30) Foreign Application Priority Data

Nov. 29, 2022 (KR) ........................ 10-2022-0162373

(51) Int. Cl.
*G06F 8/53* (2018.01)
*G06F 8/41* (2018.01)
*G06F 9/30* (2018.01)

(52) U.S. Cl.
CPC ................ *G06F 8/53* (2013.01); *G06F 8/427* (2013.01); *G06F 8/433* (2013.01); *G06F 8/4435* (2013.01); *G06F 9/30058* (2013.01)

(58) Field of Classification Search
None
See application file for complete search history.

(56) References Cited

U.S. PATENT DOCUMENTS 7,290,253 B1 * 10/2007 Agesen ...................... G06F 8/52 711/213
2004/0268333 A1 * 12/2004 Wang .................... G06F 9/3017 712/E9.035
2009/0254709 A1 * 10/2009 Agesen ...................... G06F 8/52 719/330
2014/0289726 A1 * 9/2014 Rugina ............... G06F 11/3466 718/1
2015/0356294 A1 * 12/2015 Tan ..................... G06F 9/30054 726/22
2015/0370560 A1 * 12/2015 Tan ......................... G06F 9/323 717/148
2022/0214879 A1 * 7/2022 Lemay .................. G06F 9/3004

* cited by examiner

*Primary Examiner* — Qing Chen
(74) *Attorney, Agent, or Firm* — DALY, CROWLEY, MOFFORD & DURKEE, LLP

(57) ABSTRACT

A method for determining a binary function entry includes distinguishing a text section and an exception handling section by parsing a binary code, disassembling the text section to determine an address of an end branch instruction, an address of a direct call target, and an address of a direct jump target, determining an indirect return function call address from the addresses of the end branch instructions, determining an exception handling block address from the addresses of the end branch instructions, excluding the indirect return function call address and the exception handling block address from the addresses of the end branch instructions and determining a tail call corresponding to the binary function entry from the addresses of the direct jump targets.

19 Claims, 6 Drawing Sheets

```
1 function FunSeeker (bin)
2     txt, exn ← PARSE(bin)
3     ℰ, 𝒞, 𝒥 ← DISASSEMBLE(txt)
4     ℰ' ← FILTERENDBR(ℰ, exn)
5     𝒥' ← SELECTTAILCALL(𝒥)
6     return ℰ' ∪ 𝒞 ∪ 𝒥'
```

FIG. 1

```
void foo() { ... }

int main() {
    // ..
    void (*fp)();
    fp = &fun;

    switch(input)
    {
    case '1':
        // ..
    }

    fp();
    // ..
}
```

```
foo:
  endbr64
  push  rbp
  # ...
main:
  endbr64
  # ...
  lea   rcx, [rip + foo]
  mov   [rbp - 16], rcx
  # ...
  add   rdx, rax
  notrack jmp  rdx
.LBB1_1:
  mov   ...
  # ...
  call  qword ptr [rbp - 16]
```

FIG. 2

| | | Func. Entry | Indirect Ret. | Exception |
|---|---|---|---|---|
| GCC | Coreutils | 99.98% | 0.02% | 0.00% |
| | Binutils | 99.99% | 0.01% | 0.00% |
| | SPEC CPU 2017 | 79.60% | 0.02% | 20.38% |
| Clang | Coreutils | 99.98% | 0.02% | 0.00% |
| | Binutils | 99.99% | 0.01% | 0.00% |
| | SPEC CPU 2017 | 72.10% | 0.02% | 27.88% |

FIG. 3

```
sort_files:
    # ...
  0x40a9f4:  lea      edi, failed_strcoll
  0x40a9f9:  call     setjmp
  0x40a9fe:  endbr64
  0x40aa02:  test     eax, eax
  0x40aa04:  jne      0x40aa0c
    # ...

__longjmp_chk:
    # ...
    # get saved return address
  0x13299c:  mov      rdx, QWORD PTR [rdi+0x38]
    # ... restore shadow stack ...
    # perform indirect return
  0x132a6e:  jmp      rdx
```

FIG. 4

```
_ZN8MoleculeC2Ev:
    # ...
  0x10981e:  pop      r12
  0x109820:  ret
    # This is where a catch block starts.
  0x109821:  endbr64
  0x109825:  mov      r12, rax
  0x109828:  jmp      _ZN8MoleculeC2Ev_cold
    # ...
```

FIG.7 function `FunSeeker (bin)`

Figure 7:
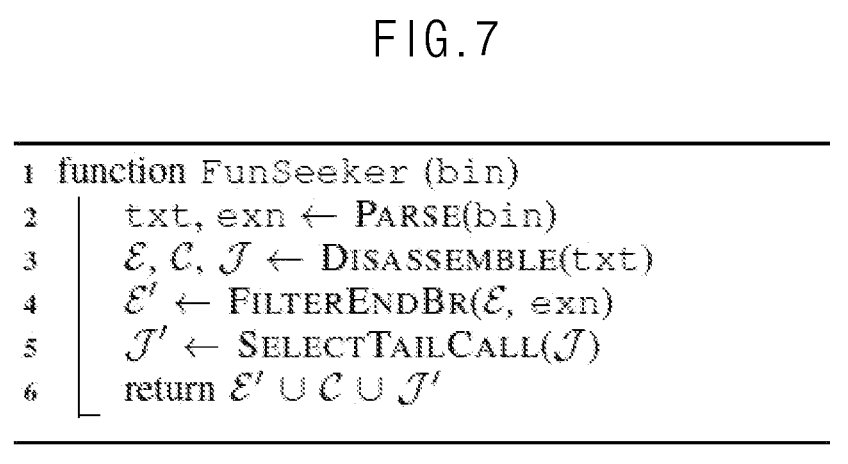

`txt`, `exn` $\leftarrow$ PARSE(`bin`)

$\mathcal{E}, \mathcal{C}, \mathcal{J} \leftarrow$ DISASSEMBLE(`txt`)

$\mathcal{E}' \leftarrow$ FILTERENDBR($\mathcal{E}$, `exn`)

$\mathcal{J}' \leftarrow$ SELECTTAILCALL($\mathcal{J}$)

return $\mathcal{E}' \cup \mathcal{C} \cup \mathcal{J}'$

METHOD AND APPARATUS FOR DETERMINING BINARY FUNCTION ENTRY

PRIORITY STATEMENT

This application claims priority under 35 U.S.C. § 119 to Korean Patent Application No. 10-2022-0162373, filed on Nov. 29, 2022 in the Korean Intellectual Property Office (KIPO), the contents of which are herein incorporated by reference in their entireties.

BACKGROUND

1. Technical Field

Embodiments relate to a method and an apparatus for determining a binary function entry. More particularly, embodiments relate to a method and an apparatus for determining a binary function entry using a location of an end branch instruction representing an indirect branch target.

2. Description of the Related Art

Function entry identification is a basic technique for generating a control flow graph. The accuracy of binary analysis and reversing may be determined by the function entry identification so that the function entry identification may be very important for the accurate binary analysis and the reversing.

In conventional studies and binary analysis tools, the function entry was identified using binary patterns, static analysis and meta information. In the binary analysis technique using existing patterns, regulations must be manually updated.

A conventional technology for automatically generating patterns through machine learning may vary in accuracy depending on the association (compiler types and options) between learning binaries and analysis target binaries.

A conventional analysis through a static analysis may require a long analysis time. In addition, a conventional function identification technology using meta information may not be applied to x86 binaries which do not have meta information.

SUMMARY

Embodiments provide a method for determining a binary function entry using a location of an end branch instruction representing an indirect branch target to implement a control flow integrity in hardware.

Embodiments provide an apparatus for determining the binary function entry using the location of the end branch instruction representing the indirect branch target to implement the control flow integrity in hardware.

In an example method for determining a binary function entry according to the present inventive concept, the method includes distinguishing a text section and an exception handling section by parsing a binary code, disassembling the text section to determine an address of an end branch instruction, an address of a direct call target, and an address of a direct jump target, determining an indirect return function call address from the addresses of the end branch instructions, determining an exception handling block address from the addresses of the end branch instructions, excluding the indirect return function call address and the exception handling block address from the addresses of the end branch instructions and determining a tail call corresponding to the binary function entry from the addresses of the direct jump targets.

In an embodiment, the binary function entry may be determined as a union of an address set excluding the indirect return function call address and the exception handling block address from the addresses of the end branch instructions, an address set of the direct call target and an address set of the tail call.

In an embodiment, the end branch instruction may represent an indirect branch target.

In an embodiment, the determining indirect return function call address may include checking whether there is a preceding call instruction which refers to a procedure linking table in a target instruction, extracting a target function name from the target instruction when there is the preceding call instruction which refers to the procedure linking table in the target instruction and comparing the target function name with names of predefined reference indirect return functions.

In an embodiment, the predefined reference indirect return functions may include a setjmp function and a vfork function.

In an embodiment, the predefined reference indirect return functions may further include a sigsetjmp function, a savectx function, and a getcontext function.

In an embodiment, in the determining the tail call, when a destination of a jump instruction is above a function including the jump instruction, the destination of the jump instruction may be determined as the tail call.

In an embodiment, in the determining the tail call, when a destination of a jump instruction is a destination of jump instructions of two or more functions, the destination of the jump instruction may be determined as the tail call.

In an embodiment, in the determining the tail call, when a destination of a jump instruction is above a function including the jump instruction and is a destination of jump instructions of two or more functions, the destination of the jump instruction may be determined as the tail call.

In an embodiment, when func_range(x) represents an address range of a function including an address x, $\mathcal{J}$ represents a set of address pairs (a, b) of addresses a of direct jump instruction and the addresses b of the direct jump targets corresponding to the addresses a of the direct jump instructions, $\mathcal{J}'$ represents an address of the tail call, $C_1=\{b|(a,b)\in\mathcal{J}\wedge(b<\min(\text{func\_range}(a))\vee b>\max(\text{func\_range}(a)))\}$ and $C_2=\{b|(a,b)\in\mathcal{J}\wedge(c,b)\in\mathcal{J}\wedge\text{func\_range}(a)\neq\text{func\_range}(c)\}$, $\mathcal{J}'=C_1\cap C_2$ may be satisfied.

In an embodiment, the end branch instructions may be located at the binary function entry, the indirect return function call address and the exception handling block address.

In an embodiment, the binary function entry may include the end branch instruction, the direct call target or the direct jump target.

In an example apparatus for determining a binary function entry according to the present inventive concept, the apparatus includes a parser, a disassembler, a filter and a tail call selector. The parser is configured to parse a binary code to distinguish a text section and an exception handling section. The disassembler is configured to disassemble the text section to determine an address of an end branch instruction, an address of a direct call target, and an address of a direct jump target. The filter is configured to determine an indirect return function call address and an exception handling block address from the addresses of the end branch instructions, and exclude the indirect return function call address and the exception handling block address from the addresses of the end branch instructions. The tail call selector is configured to determine a tail call corresponding to the binary function entry from the addresses of the direct jump targets.

In an embodiment, the binary function entries may be determined as a union of an address set excluding the indirect return function call address and the exception handling block address from the addresses of the end branch instructions, an address set of the direct call targets and an address set of the tail calls.

In an embodiment, the end branch instruction may represent an indirect branch target.

In an embodiment, when a destination of a jump instruction is above a function including the jump instruction and is a destination of jump instructions of two or more functions, the tail call selector may be configured to determine the destination of the jump instruction as the tail call.

In an embodiment, when func_range(x) represents an address range of a function including an address x, $\mathcal{J}$ represents a set of address pairs (a, b) of addresses a of direct jump instruction and the addresses b of the direct jump targets corresponding to the addresses a of the direct jump instructions, $\mathcal{J}'$ represents an address of the tail call, $C_1=\{b|(a,b)\in\mathcal{J}\wedge(b)<\min(\text{func\_range}(a))\vee b>\max(\text{func\_range}(a)))\}$ and $C_2=\{b|(a,b)\in\mathcal{J}\wedge(c,b)\in\mathcal{J}\wedge\text{func\_range}(a)\neq\text{func\_range}(c)\}$, $\mathcal{J}'=C_1\cap C_2$ may be satisfied.

In an example method for determining a binary function entry according to the present inventive concept, the method includes generating an end branch instruction address from a binary code as a candidate, excluding an indirect return function call address and an exception handling block address from the candidate set and determining an address of a tail call function and including the address of the tail call function in the candidate set.

In an embodiment, when a destination of a jump instruction is above a function including the jump instruction and is a destination of jump instructions of two or more functions, the destination of the jump instruction may be determined as the address of the tail call function.

According to the method and the apparatus for determining the binary function entry (the binary function start address), the binary function entry may be determined using the location of the end branch instruction representing the indirect branch target to implement the control flow integrity in hardware.

In addition, the indirect return function call address and the address of the exception handling block may be excluded from the addresses of the end branch instructions so that the binary function entry may be determined more accurately.

In addition, the address of the tail call may be selected from the addresses of the direct jump targets so that the binary function entry may be determined more accurately.

In this way, by accurately determining the binary function entry, the accurate execution flow graph may be restored, and the accuracy of binary analysis and reversing may be increased. In particular, the method of determining the function entry of the present inventive concept uses only binary codes and exception handling information which are essential for execution so that the method may be applied to commercial x86/x64 binaries which do not include symbols and debugging information.

BRIEF DESCRIPTION OF THE DRAWINGS

The above and other features and advantages of the present inventive concept will become more apparent by describing in detailed embodiments thereof with reference to the accompanying drawings, in which:

FIG. 1 is a diagram illustrating a C code and an assembly code for explaining an end branch instruction and a notrack prefix;

FIG. 2 is a diagram illustrating a location of an end branch instruction according to a compiler and a binary code package;

FIG. 3 is a diagram illustrating an example of the end branch instruction corresponding to an indirect return;

FIG. 4 is a diagram illustrating an example of the end branch instruction corresponding to an exception handling block;

FIG. 7 is a diagram illustrating a method for determining the binary function entry according to an embodiment of the present inventive concept;

DETAILED DESCRIPTION OF THE EMBODIMENTS

Figure 5:
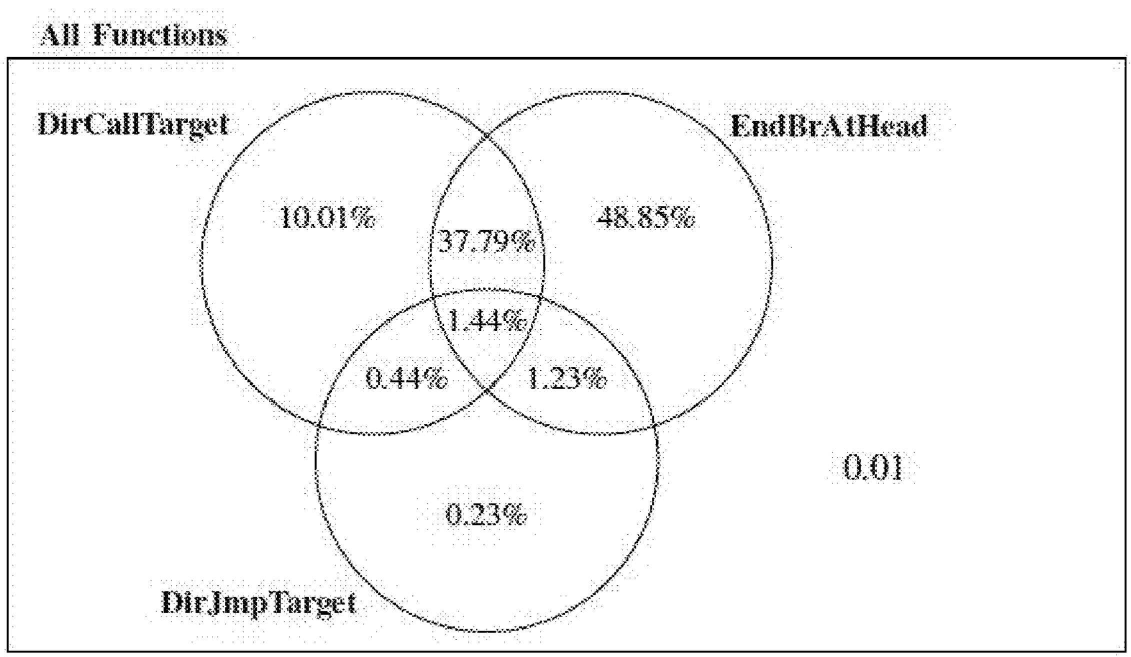
FIG. 5 is a diagram illustrating characteristics of a function in a predefined data set.

The present inventive concept now will be described more fully hereinafter with reference to the accompanying drawings, in which embodiments of the present invention are shown. The present inventive concept may, however, be embodied in many different forms and should not be construed as limited to the embodiments set forth herein.

Rather, these embodiments are provided so that this disclosure will be thorough and complete, and will fully convey the scope of the present invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the inventive concept as used herein.

Hereinafter, the present inventive concept will be explained in detail with reference to the accompanying drawings.

FIG. 1 is a diagram illustrating a C code and an assembly code for explaining an end branch instruction and a notrack prefix. FIG. 2 is a diagram illustrating a location of an end branch instruction according to a compiler and a binary code package. FIG. 3 is a diagram illustrating an example of the end branch instruction corresponding to an indirect return. FIG. 4 is a diagram illustrating an example of the end branch instruction corresponding to an exception handling block. FIG. 5 is a diagram illustrating characteristics of a function in a predefined data set.

Referring to FIGS. 1 to 5, CET (Control-Flow Enforcement Technology) is a hardware support technology developed to defend against control flow hijacking attacks using memory vulnerabilities. CET guarantees Control-Flow Integrity (CFI) of binary code through hardware technology, and memory vulnerability attacks may be prevented through this. CET may include two techniques defined for control flow integrity: Shadow Stack (SS) and Indirect Branch Tracking (IBT). In the SS, the function return address is copied and stored in an address space safe from attackers. In the SS, the called return address may be compared to the stored return address when performing a function return so that the integrity may be ensured. In the IBT, a specially predefined end branch instruction is forced to be inserted into an indirect branch target, and integrity may be guaranteed by checking whether or not there is an end branch instruction in the indirect branch target. This CET technique is performed at a hardware level so that it may generate little overhead.

A main stream Intel CPU is equipped with the CET function, and the Linux operating system also provides a library and runtime environment to support the CET function. In addition, the complier which generates the executable binary applies the CET function as a basic option, so the CET function is activated in most Linux binary files.

IBT may protect forward indirect branches, such as jmp and call instructions. IBT may check for every indirect branch instruction if it jumps to a predefined code location marked via an end branch (ENDBR32 or ENDBR64) instruction.

A left portion of FIG. 1 shows an example C program containing a switch case statement and a right portion of FIG. 1 shows the CET-enabled x86-64 binary counterpart corresponding to the example C program.

Note that every function in the binary starts with ENDBR64, which indicates that every function can potentially be a jump target of an indirect branch. In Line 12 of the right portion of FIG. 1, there is an indirect jump prefixed with NOTRACK. The instruction represents the switch statement in the left portion of FIG. 1, and the prefix NOTRACK may be used to mean that the instruction does not need to advance to an end branch instruction because compilers typically put an input range checking before the indirect jump instruction. Thus, the compilers do not insert an end branch instruction for the switch case clauses.

FIG. 2 represents a result of linearly disassembling every binary for a predetermined dataset to understand the usage pattern of the end branch instructions. As shown in FIG. 2, the end branch instructions may be located at the binary function entry, the indirect return function call and the exception handling block (an exception catch block).

In the dataset, for the GCC compiler and the Coreutils binary code package, 99.98% of all end branch instructions are located at the function entries, and 0.02% of all end branch instructions are located at the indirect return function calls.

In the dataset, for the GCC compiler and the Binutils binary code package, 99.99% of all end branch instructions are located at the function entries, and 0.01% of all end branch instructions are located at the indirect return function calls.

In the dataset, for the GCC compiler and the SPEC CPU 2017 binary code package, 79.60% of all end branch instructions are located at the function entries, 0.02% of all end branch instructions are located at the indirect return function calls and 20.38% of all end branch instructions are located at the exception handling blocks.

In the dataset, for the Clang compiler and the Coreutils binary code package, 99.98% of all end branch instructions are located at the function entries, and 0.02% of all end branch instructions are located at the indirect return function calls.

In the dataset, for the Clang compiler and the Binutils binary code package, 99.99% of all end branch instructions are located at the function entries, and 0.01% of all end branch instructions are located at the indirect return function calls.

In the dataset, for the Clang compiler and the SPEC CPU 2017 binary code package, 72.10% of all end branch instructions are located at the function entries, 0.02% of all end branch instructions are located at the indirect return function calls and 27.88% of all end branch instructions are located at the exception handling blocks.

While the majority of end branch instructions were found at a function entry, more than 20% of the cases were found in an exception handling block for the SPEC CPU 2017 binaries. Note that the SPEC CPU 2017 benchmark includes C++ programs, while Coreutils and Binutils do not.

This result highlights that simply regarding an end branch instruction as a function entry may produce a considerable amount of false positives for C++ binaries.

Compilers tend to add an end branch instruction at every non-static function entry because one cannot decide whether a non-static function will be referenced by a function pointer before linking. Indeed, most of the end branch instructions in the dataset are located at a function entry. However, this does not mean that every function starts with an end branch instruction. For example, static functions do not have an end branch instruction unless they are referenced by a function pointer. In addition, there are many other cases where functions do not include an end branch instruction.

Functions may return via an indirect jump instruction instead of a ret. Such functions have the indirect return attribute, and an end branch instruction is inserted right after the call site, to protect the return edge. For example, setjmp is used to save the current execution context in a dedicated buffer, and the context may be restored by longjmp.

FIG. 3 illustrates this case, where an end branch instruction is located right after the call instruction at 0x40a9f9. At the end of the longjmp call, the indirect jump instruction at 0x132a6e will transfer the control flow of the program to 0x40a9fe. In addition, the compilers may predefine a list of indirect return functions, such as setjmp, sigsetjmp, and vfork. Therefore, it may be easily decided whether an end branch instruction is for handling an indirect return function call or not. For example, in FIG. 3, an end branch instruction is disposed at a position returning after calling setjmp, but the end branch instruction disposed at the position returning after calling setjmp does not indicate the function entry.

C++ exceptions may be handled by the libstdc++ library, which uses an indirect jump to transfer the control to a catch clause. Therefore, each catch clause starts with an end branch instruction. In the dataset, C++ binaries from SPEC CPU 2017 show end branch instructions at an exception handling block. FIG. 4 presents an example of a catch block located at 0x109821 of the 508.namd binary. The catch block at 0x109821 starts with an end branch instruction. For example, in FIG. 4, the catch block at 0x109821 means an exception handling code, and an end branch instruction is disposed at the catch block at 0x109821, but the end branch instruction disposed at the catch block at 0x109821 does not indicate the function entry.

FIG. 5 represents the results of examining the syntactic properties of all functions which may or may not include an end branch instruction. Now that we know end branch instructions may be placed at several different places other than a function entry, we now describe how many functions indeed start with an end branch instruction. To this end, we first extracted 11,209,121 functions from the dataset using the debugging symbols. We then linearly disassembled the entire code section of each binary to check if the following three properties hold for each of the functions:

"EndBrAtHead": there is an end branch at the function entry.

"DirJmpTarget": there is a direct jump to the function.

"DirCallTarget": there is a direct call to the function.

As such, the binary function entry may include the end branch instruction, the direct call target, or the direct jump target.

FIG. 5 illustrates how each of the properties holds and how they overlap with each other. Note that about 89.3% (=48.85+37.79+1.44+1.23) of the functions start with an end branch instruction (EndBrAtHead). This means one cannot completely retrieve function entries by simply looking at end branch instructions.

For the 11% of the functions without an end branch instruction, we found most of them are referenced by a direct jump or a direct call instruction. In other words, we found that at least one of the three properties holds for 99.99% of the functions. The two properties, DirJmpTarget and DirCallTarget, are useful to make up for the lack of end branch instructions because one can easily obtain the target address of direct branches.

We further analyzed the rest 0.01% of the functions which do not satisfy any of the properties, and found that they are all dead code that is never referenced by any other instruction.

Figure 6:
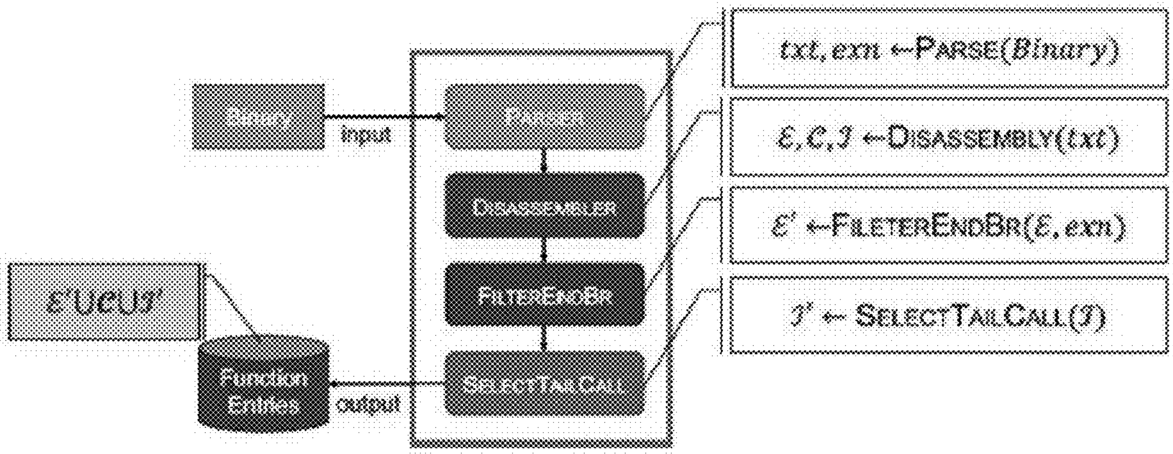
FIG. 6 is a block diagram illustrating an apparatus for determining a binary function entry according to an embodiment of the present inventive concept.
Figure 8:
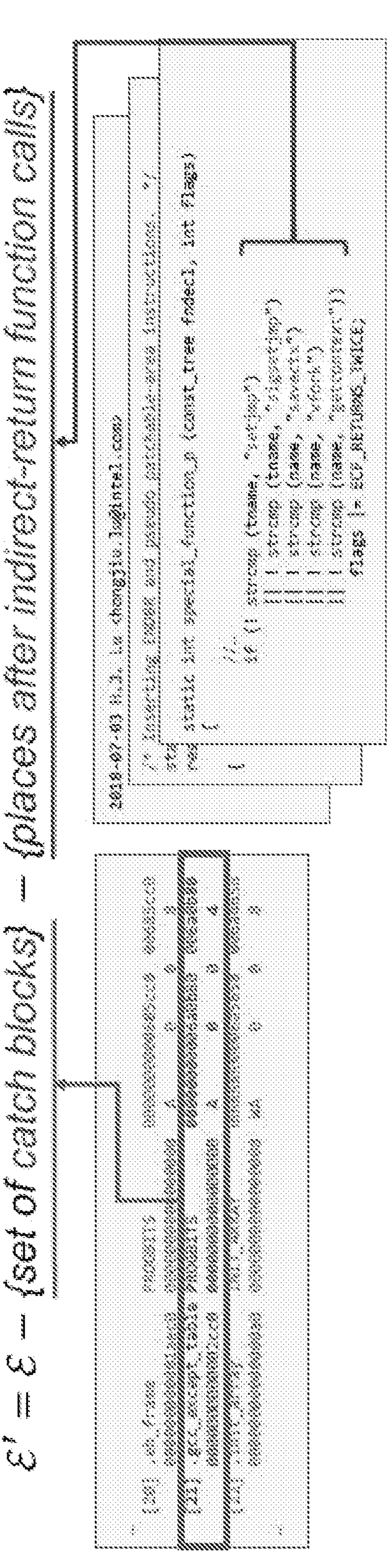
FIG. 8 is a diagram illustrating an operation of excluding an indirect return function call address and an address of the exception handling block from addresses of the end branch instructions.
Figure 9:
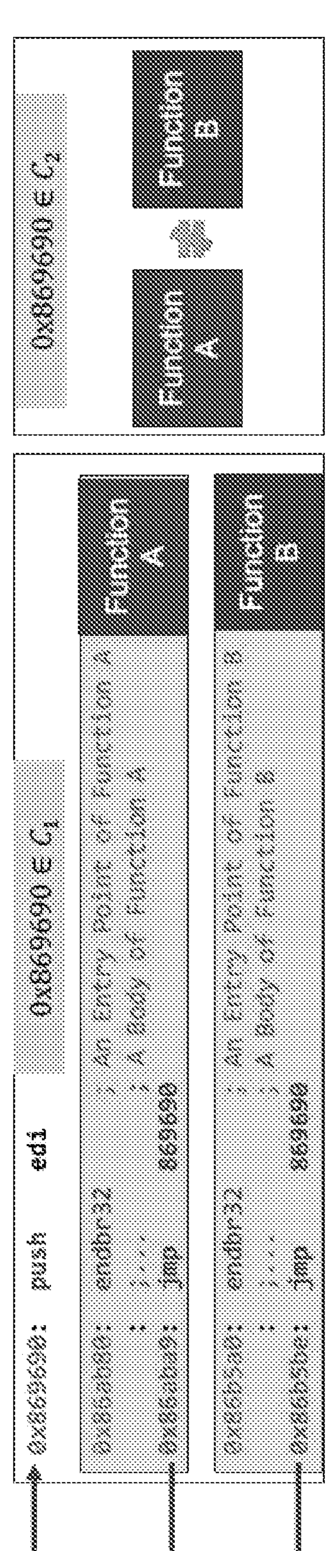
FIG. 9 is a diagram illustrating an operation of determining a tail call.

FIG. 6 is a block diagram illustrating an apparatus for determining a binary function entry according to an embodiment of the present inventive concept. FIG. 7 is a diagram illustrating a method for determining the binary function entry according to an embodiment of the present inventive concept. FIG. 8 is a diagram illustrating an operation of excluding an indirect return function call address and an address of the exception handling block from addresses of the end branch instructions. FIG. 9 is a diagram illustrating an operation of determining a tail call.

Referring to FIGS. 1 to 9, an input of the apparatus for determining binary function entry is a binary code and an output of the apparatus for determining binary function entry is binary function entries in the binary code.

The apparatus for determining binary function entry includes a parser, a disassembler, a filter and a tail call selector.

The parser may parse the binary code to distinguish a text section (txt) and an exception handling section (exn).

The disassembler may disassemble the text section to determine an end branch instruction address ($\varepsilon$), a direct call target address ($\mathcal{C}$), and an address pair ($\mathcal{J}$) of a direct jump instruction address a and a direct jump target address b corresponding to the direct jump instruction address a.

The filter may determine an indirect return function call address and an exception handling block address from the end branch instruction addresses ($\varepsilon$), and exclude the indirect return function call address and the exception handling block address from the end branch instruction addresses. A result of excluding the indirect return function call address and the exception handling block address from the end branch instruction addresses is indicated by $\varepsilon'$ in FIGS. 6 and 7.

The tail call selector may determine the tail call corresponding to the binary function entry from the address pair ($\mathcal{J}$) regarding the direct jump instruction. An address of the tail call is indicated by $\mathcal{J}'$ in FIGS. 6 and 7.

For example, the binary function entries may be determined as a union ($\varepsilon \cup \mathcal{C} \cup \mathcal{J}'$) of an address set ($\varepsilon'$) excluding the indirect return function call address and the exception handling block address from the end branch instruction addresses, an address set ($\mathcal{C}$) of the direct call targets and an address set $\mathcal{J}'$ of the tail call.

As described above, the end branch instruction may indicate an indirect branch target. Specifically, the end branch instruction may indicate an indirect branch target in order to implement the control flow integrity in hardware.

The method for determining the binary function entry includes distinguishing the text section and the exception handling section by parsing the binary code, disassembling the text section to determine the end branch instruction address, the direct call target address, and the direct jump target address, determining the indirect return function call address from the end branch instruction addresses, determining the exception handling block address from the end branch instruction addresses, excluding the indirect return function call address and the exception handling block address from the end branch instruction addresses and determining a tail call corresponding to the binary function entry from the direct jump target addresses.

For example, PARSE (in Line 2 of FIG. 7) first analyzes the given binary bin to extract the text section (txt) and the C++ exception information (exn) from it. Note exn only exists for C++ binaries, and thus, it does not affect C binaries.

Next, DISASSEMBLE (in Line 3 of FIG. 7) linearly disassembles txt, and examines every direct branch instruction to return a 3-tuple ($\varepsilon$, $\mathcal{C}$; $\mathcal{J}$), Herein, $\varepsilon$ is a set of end branch instruction addresses found in txt, $\mathcal{C}$ is a set of direct call target addresses and $\mathcal{J}$ is a set of address pairs (a, b) of the direct jump instruction addresses a and direct jump target addresses b corresponding to the direct jump instruction addresses a.

For example, DISASSEMBLE may perform linear-sweep disassembly from a start address of the given .text section txt until reaching the end of the section. For example, in case there is a disassembly error in DISASSEMBLE, we increase a program counter by one, and resume the disassembly process. The primary goal here is to find all the end branch instructions as well as direct jump instructions.

FILTERENDBR (in Line 4) then tries to remove end branch instructions that are not relevant to a function entry to obtain $\varepsilon'$.

As explained above, end branch instructions may be placed at two different locations other than a function entry. To reduce false-positives in identifying functions, we need to filter out end branch instructions that are placed either after an indirect return function call or at an exception handling block.

The determining the indirect return function call address may include checking whether there is a preceding call instruction which refers to a procedure linking table in a target instruction, extracting a target function name from the target instruction when there is the preceding call instruction which refers to the procedure linking table in the target instruction and comparing the target function name with names of predefined reference indirect return functions.

When the target function name is same as one of the names of the predefined reference indirect return functions, it means that the target function represents a return target of the indirect return function so that a corresponding branch instruction address may be removed from $\varepsilon$.

Referring to FIG. 8, the predefined reference indirect return functions may include a setjmp function and a vfork function. In addition, the predefined reference indirect return functions may further include a sigsetjmp function, a savectx function, and a getcontext function.

In FILTERENDBR, every Language-Specific Data Area (LSDA) of the .gcc_except_table section may be analyzed to see if there is any end branch instruction that belongs to a landing pad, i.e., the exception handling block. The .gcc_except_table section is essential in handling C++ exceptions, and cannot be stripped.

Next, SELECTTAILCALL (in Line 5 of FIG. 7) identifies tail calls from a set of direct jump targets $\mathcal{J}$ to get $\mathcal{J}'$.

Not all direct jump targets defined in $\mathcal{J}$ indicate function entries. Only when the direct jump target defined in $\mathcal{J}$ is the tail call ($\mathcal{J}'$), the direct jump target indicates the function entry.

For example, in the determining the tail call, when a destination of a jump instruction is above a function including the jump instruction, the destination of the jump instruction may be determined as the tail call.

For example, in the determining the tail call, when a destination of a jump instruction is a destination of jump instructions of two or more functions, the destination of the jump instruction may be determined as the tail call.

For example, in the determining the tail call, when a destination of a jump instruction is above a function including the jump instruction and is a destination of jump instructions of two or more functions, the destination of the jump instruction may be determined as the tail call.

FIG. 9 represents an example of a specific method for determining the tail call. Referring to FIG. 9, when func_range(x) represents an address range of a function including an address x, and $\mathcal{J}'$ represents the address of the tail call, $C_1=\{b|(a,b)\in\mathcal{J}\wedge(b)<\min(\text{func\_range}(a))\vee b>\max(\text{func\_range}(a)))\}$ and $C_2=\{b|(a,b)\in\mathcal{J}\wedge(c,b)\in\mathcal{J}\wedge\text{func\_range}(a)\neq\text{func\_range}(c)\}$, $\mathcal{J}'=C_1\cap C_2$ may be satisfied. In FIG. 9, 0x869690 satisfies $C_1$ and 0x869690 satisfies $C_2$ so that 0x869690 may be determined as the address of the tail call.

Herein, the address $\mathcal{J}$ of the direct jump target may mean a set of address pairs (a, b) of the direct jump instruction address a and the direct jump target address b corresponding to the direct jump instruction address a.

Finally, Line 6 of FIG. 7 combines $\varepsilon'$, $\mathcal{C}$, and $\mathcal{J}'$ to get the final set $\varepsilon'\cup\mathcal{C}\cup\mathcal{J}'$ of function entries.

The method for determining the binary function entry according to an embodiment includes generating an end branch instruction address from the binary code as a candidate set $\varepsilon$, excluding an indirect return function call address and an exception handling block address from the candidate set $\varepsilon$ and determining an address $\mathcal{J}'$ of a tail call function and including the address $\mathcal{J}'$ of the tail call function in the candidate set.

Herein, the candidate set from which the indirect return function call address and the exception handling block address are excluded may be expressed as $\varepsilon'$.

When a destination of a jump instruction is above a function including the jump instruction and is a destination of jump instructions of two or more functions, the destination of the jump instruction may be determined as the address $\mathcal{J}'$ of the tail call function.

According to the present embodiment, the binary function entry may be determined using the location of the end branch instruction representing the indirect branch target to implement the control flow integrity in hardware.

In addition, the indirect return function call address and the address of the exception handling block may be excluded from the addresses of the end branch instructions so that the binary function entry may be determined more accurately.

In addition, the address of the tail call may be selected from the addresses of the direct jump targets so that the binary function entry may be determined more accurately.

In this way, by accurately determining the binary function entry, the accurate execution flow graph may be restored, and the accuracy of binary analysis and reversing may be increased. In particular, the method of determining the function entry of the present inventive concept uses only binary codes and exception handling information which are essential for execution so that the method may be applied to commercial x86/x64 binaries which do not include symbols and debugging information.

According to the present inventive concept, the binary function entry may be determined using the location of the end branch instruction representing the indirect branch target to implement the control flow integrity in hardware. By determining the binary function entry, the control flow graph may be generated.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A method for determining a valid binary function entry, the method comprising:

executing, via a compiler, a Control-Flow Enforcement Technology (CET) function performed at a hardware level to guarantee Control-Flow Integrity (CFI) of a binary code by:

parsing, via the compiler using the CET function, the binary code to distinguish a text section and an exception handling section of the binary code, wherein the binary code is previously processed, via the compiler using the CET function, by inserting one or more end branch instructions into the text section at one or more binary function entries;

disassembling, via the compiler using the CET function, the text section to determine addresses of the one or more end branch instructions, addresses of direct call targets, and addresses of direct jump targets;

determining, via the compiler using the CET function, an indirect return function call address from the addresses of the one or more end branch instructions;

determining, via the compiler using the CET function, an exception handling block address from the addresses of the one or more end branch instructions;

excluding, via the compiler using the CET function, the indirect return function call address and the exception handling block address from the addresses of the one or more end branch instructions, such that each invalid binary function entry of the one or more binary function entries associated with the indirect return function call address and the exception handling block address are excluded; and determining, via the compiler using the CET function, a tail call corresponding to the valid binary function entry of the one or more binary function entries from the addresses of the direct jump targets.

2. The method of claim 1, wherein the valid binary function entry is determined as a union of an address set excluding the indirect return function call address and the exception handling block address from the addresses of the one or more end branch instructions, an address set of the direct call targets, and an address set of the tail call.

3. The method of claim 1, wherein an end branch instruction of the one or more end branch instructions represents an indirect branch target.

4. The method of claim 1, wherein the determining the indirect return function call address from the addresses of the one or more end branch instructions comprises:

checking whether there is a preceding call instruction which refers to a procedure linking table in a target instruction;

extracting a target function name from the target instruction when there is the preceding call instruction which refers to the procedure linking table in the target instruction; and comparing the target function name with names of predefined reference indirect return functions.

5. The method of claim 4, wherein the predefined reference indirect return functions include a setjmp function and a vfork function.

6. The method of claim 5, wherein the predefined reference indirect return functions further include a sigsetjmp function, a savectx function, and a getcontext function.

7. The method of claim 1, wherein, in the determining the tail call, when a destination of a jump instruction is above a function including the jump instruction, the destination of the jump instruction is determined as the tail call.

8. The method of claim 1, wherein, in the determining the tail call, when a destination of a jump instruction is a destination of jump instructions of two or more functions, the destination of the jump instruction is determined as the tail call.

9. The method of claim 1, wherein, in the determining the tail call, when a destination of a jump instruction is above a function including the jump instruction and is a destination of jump instructions of two or more functions, the destination of the jump instruction is determined as the tail call.

10. The method of claim 9, wherein when func_range(x) represents an address range of a function including an address x, a represents addresses of direct jump instructions, b represents the addresses of the direct jump targets, $\mathcal{J}$ represents a set of address pairs (a, b) of the addresses of the direct jump instructions and the addresses of the direct jump targets corresponding to the addresses of the direct jump instructions, $\mathcal{J}'$ represents an address of the tail call, $C_1=\{b \mid (a,b)\in\mathcal{J} \wedge (b<\min(\text{func\_range}(a)) \vee b>\max(\text{func\_range}(a)))\}$ and $C_2=\{b \mid (a,b)\in\mathcal{J} \wedge (c,b)\in\mathcal{J} \wedge \text{func\_range}(a)\neq\text{func\_range}(c)\}$, $\mathcal{J}'=C_1\cap C_2$ may be satisfied.

11. The method of claim 1, wherein the one or more end branch instructions are located at the valid binary function entry, the indirect return function call address, and the exception handling block address.

12. The method of claim 1, wherein the valid binary function entry includes an end branch instruction of the one or more end branch instructions, a direct call target of the direct call targets, or a direct jump target of the direct jump targets.

13. An apparatus for determining a valid binary function entry, the apparatus comprising:

a central processing unit (CPU);

a memory; and a complier, wherein the complier, when run by the CPU, executes a Control-Flow Enforcement Technology (CET) function performed at a hardware level to guarantee Control-Flow Integrity (CFI) of a binary code, and wherein the compiler comprises:

a parser configured to parse the binary code to distinguish a text section and an exception handling section of the binary code, wherein the binary code is previously processed, via the compiler using the CET function, by inserting one or more end branch instructions into the text section at one or more end branch instructions at one or more binary function entries;

a disassembler configured to disassemble the text section to determine addresses of the one or more end branch instructions, addresses of direct call targets, and addresses of direct jump targets;

a filter configured to determine an indirect return function call address and an exception handling block address from the addresses of the one or more end branch instructions, and exclude the indirect return function call address and the exception handling block address from the addresses of the one or more end branch instructions, such that each invalid binary function entry of the one or more binary function entries associated with the indirect return function call address and the exception handling block address are excluded; and a tail call selector configured to determine a tail call corresponding to the valid binary function entry of the one or more binary function entries from the addresses of the direct jump targets.

14. The apparatus of claim 13, wherein the valid binary function entry is determined as a union of an address set excluding the indirect return function call address and the exception handling block address from the addresses of the one or more end branch instructions, an address set of the direct call targets, and an address set of the tail call.

15. The apparatus of claim 13, wherein an end branch instruction of the one or more end branch instructions represents an indirect branch target.

16. The apparatus of claim 13, wherein when a destination of a jump instruction is above a function including the jump instruction and is a destination of jump instructions of two or more functions, the tail call selector is further configured to determine the destination of the jump instruction as the tail call.

17. The apparatus of claim 16, wherein when func_range (x) represents an address range of a function including an address x, a represents addresses of direct jump instructions, b represents the addresses of the direct jump targets, $\mathcal{J}$ represents a set of address pairs (a, b) of the addresses of the direct jump instructions and the addresses of the direct jump targets corresponding to the addresses of the direct jump instructions, $\mathcal{J}'$ represents an address of the tail call, $C_1=\{b|(a,b)\in\mathcal{J}\wedge(b<\min(\text{func\_range}(a))\vee b>\max(\text{func\_range}(a)))\}$ and $C_2=\{b|(a,b)\in\mathcal{J}\wedge(c,b)\in\mathcal{J}\wedge\text{func\_range}(a)\neq\text{func\_range}(c)\}$, $\mathcal{J}'=C_1\cap C_2$ may be satisfied.

18. A method for determining a valid binary function entry, the method comprising:

executing, via a compiler, a Control-Flow Enforcement Technology (CET) function performed at a hardware level to guarantee Control-Flow Integrity (CFI) of a binary code by:

generating, via the compiler using the CET function, an end branch instruction address from the binary code as a candidate set, wherein the binary code is previously processed, via the compiler using the CET function, by inserting one or more end branch instructions into the binary code at one or more binary function entries;

determining, via the compiler using the CET function, an indirect return function call address from the addresses of the one or more end branch instructions;

determining, via the compiler using the CET function, an exception handling block address from the addresses of the one or more end branch instructions;

excluding, via the compiler using the CET function, the indirect return function call address and the exception handling block address from the candidate set, such that each invalid binary function entry of the one or more binary function entries associated with the indirect return function call address and the exception handling block address are excluded; and determining, via the compiler using the CET function, an address of a tail call function and including the address of the tail call function in the candidate set, wherein the address of the tail call function is associated with the valid binary function entry.

19. The method of claim 18, wherein when a destination of a jump instruction is above a function including the jump instruction and is a destination of jump instructions of two or more functions, the destination of the jump instruction is determined as the address of the tail call function.

* * * * *